US008908140B2

United States Patent
Moriya et al.

(10) Patent No.: US 8,908,140 B2
(45) Date of Patent: Dec. 9, 2014

(54) LIQUID CRYSTAL DISPLAY PANEL AND LIQUID CRYSTAL DISPLAY DEVICE

(75) Inventors: Yoshimizu Moriya, Osaka (JP); Yasuyoshi Kaise, Osaka (JP); Yasutoshi Tasaka, Osaka (JP); Yuki Kawashima, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 39 days.

(21) Appl. No.: 13/581,358

(22) PCT Filed: Mar. 25, 2011

(86) PCT No.: PCT/JP2011/057437
§ 371 (c)(1),
(2), (4) Date: Aug. 27, 2012

(87) PCT Pub. No.: WO2011/129191
PCT Pub. Date: Oct. 20, 2011

(65) Prior Publication Data
US 2012/0320325 A1    Dec. 20, 2012

(30) Foreign Application Priority Data
Apr. 16, 2010    (JP) ................................ 2010-095101

(51) Int. Cl.
*G02F 1/1339* (2006.01)
*G02F 1/1337* (2006.01)
*G02F 1/1343* (2006.01)

(52) U.S. Cl.
CPC ...... *G02F 1/13394* (2013.01); *G02F 1/133707* (2013.01)
USPC ............................ 349/155; 349/129; 349/139

(58) Field of Classification Search
CPC ............ G02F 1/13392; G02F 1/13394; G02F 1/133797
USPC .................................. 349/155–156, 129, 139
See application file for complete search history.

(56) References Cited

U.S. PATENT DOCUMENTS

| | | | |
|---|---|---|---|
| 6,115,098 A | 9/2000 | Kume et al. | |
| 6,208,402 B1* | 3/2001 | Tajima | 349/156 |
| 6,690,441 B2* | 2/2004 | Moriya | 349/130 |
| 7,391,489 B2* | 6/2008 | Kume et al. | 349/129 |

(Continued)

FOREIGN PATENT DOCUMENTS

| | | |
|---|---|---|
| JP | 11-242211 A | 9/1999 |
| JP | 2000-075302 A | 3/2000 |

(Continued)

OTHER PUBLICATIONS

Official Communication issued in International Patent Application No. PCT/JP2011/057437, mailed on May 24, 2011.

*Primary Examiner* — Dung Nguyen
(74) *Attorney, Agent, or Firm* — Keating & Bennett, LLP (57) ABSTRACT

The present invention provides a liquid crystal display panel that has an enhanced liquid crystal alignment controlling force irrespective of the external conditions or environments. The enhanced liquid crystal alignment controlling force sufficiently prevents surface roughness or color unevenness that can occur depending on the viewing angle, so that favorable display qualities and excellent transmittance can be achieved. The liquid crystal display panel includes a pair of substrates comprising a pixel electrode and a counter electrode; and a liquid crystal layer disposed between the substrates, the liquid crystal display panel comprising spacers at at least four corners of a pixel defined by the pixel electrode.

8 Claims, 5 Drawing Sheets

(56) References Cited

U.S. PATENT DOCUMENTS

| | | | |
|---|---|---|---|
| 7,728,937 B2* | 6/2010 | Kume et al. | 349/129 |
| 7,755,737 B2* | 7/2010 | Taniguchi et al. | 349/156 |
| 2003/0179172 A1 | 9/2003 | Miyachi | |
| 2006/0263920 A1 | 11/2006 | Kim et al. | |
| 2008/0111964 A1 | 5/2008 | Shirasaka et al. | |
| 2008/0225199 A1* | 9/2008 | Tsubokura et al. | 349/60 |
| 2009/0174637 A1 | 7/2009 | Fukami | |
| 2010/0068965 A1 | 3/2010 | Kim et al. | |
| 2012/0147306 A1* | 6/2012 | Moriya et al. | 349/113 |

FOREIGN PATENT DOCUMENTS

| | | |
|---|---|---|
| JP | 2001-75103 A | 3/2001 |
| JP | 2003-207785 A | 7/2003 |
| JP | 2003-279929 A | 10/2003 |
| JP | 2005-302995 A | 10/2005 |
| JP | 2006-323393 A | 11/2006 |
| JP | 2007-171716 A | 7/2007 |
| JP | 2007-192944 A | 8/2007 |
| JP | 2007-328129 A | 12/2007 |
| JP | 2009-163007 A | 7/2009 |

\* cited by examiner

LIQUID CRYSTAL DISPLAY PANEL AND LIQUID CRYSTAL DISPLAY DEVICE

TECHNICAL FIELD

The present invention relates to a liquid crystal display panel and a liquid crystal display device. More specifically, the present invention relates to a liquid crystal display panel and a liquid crystal display device which are suitable for mobile use or touch-panel use, and have excellent properties such as high definition and high transmittance.

BACKGROUND ART

Liquid crystal display devices are thin and light weight, and consume low power. These properties allow the liquid crystal display devices to be widely used as display devices for various electronics today. Examples thereof include products such as mobile display panels and large display panels. Particularly, mobile display panels with high definition and high transmittance have been increasingly desired in recent years, which are to be mounted on cellphones, personal digital assistants (PDA such as PDA phones), digital still cameras (DSCs), or the like because there is a great demand for mobile goods. At the same time, the operability of such mobile display panels has been focused, which also has led to an increasing desire for a mobile display panel mounted with a touch panel as a standard feature.

One of the display modes for such liquid crystal display devices is a vertical alignment mode (also referred to as a VA mode), and liquid crystal display devices in such a mode have been drawing attention for having a high definition liquid crystal panel. This mode achieves a very high contrast ratio, which enables to improve the visibility even outdoors where mobile devices are often used. Also, conventionally, liquid crystal display devices provided with a substrate on which thin-film transistors (hereinafter, also referred to as TFTs) exhibiting excellent display qualities are used. A major issue for these liquid crystal display devices having excellent display qualities is assuring the advantage in the properties of the display devices when they are used for mobiles or provided with touch panels.

Patent Literature 1, for example, discloses a VA mode liquid crystal display device including: a first substrate having scanning lines and signal lines arranged in perpendicular to each other, switching elements arranged in the vicinity of intersections of the scanning lines and the signal lines, and pixel electrodes connected to the signal lines through the switching elements; a second substrate having a counter electrode arranged to face the pixel electrodes; spacers forming a predetermined gap between the first substrate and the second substrate; a liquid crystal layer including liquid crystal molecules that have negative dielectric constant anisotropy in the predetermined gap formed by the spacers; and an alignment controlling electrode that is arranged on the spacer surface and is different in the electric potential or floating from at least one of the pixel electrode and the counter electrode.

CITATION LIST

Patent Literature

Patent Document 1: JP 2001-75103 A

SUMMARY OF INVENTION

Technical Problem

The above conventional liquid crystal display device has a spacer with an alignment control electrode on its surface at an intersection of a scanning line and a signal line in a vertical alignment mode liquid crystal display element. The alignment control electrode provides a potential difference between the pixel electrode and a counter electrode, so as to enable formation of an electric field inclined from the normal line of the substrate, between the pixel electrode and the counter electrode. The liquid crystal display device can easily divide the alignment direction of the liquid crystal molecules by forming an alignment control window in the pixel electrode or counter electrode, thereby having a multi-domain structure for achieving a wide viewing angle, high contrast, and high-speed response. The technique for improving the display characteristics by providing, for example, an alignment controlling object in a VA mode transmission liquid crystal display device includes a technique of providing a single domain structure in which the region in each pixel is dealt as a single region for alignment control, and a multi-domain structure in which the region in each pixel is divided into multiple regions for alignment control.

FIG. 1 of Patent Literature 1, for example, illustrates a liquid crystal display device using an alignment control window along one diagonal line in a pixel and pillar spacers at two ends of the other diagonal line, which provides alignment divided into two directions. Such a liquid crystal display device provides insufficient viewing angle compensation and relatively low alignment controlling forces at the corners without the spacers, compared to a liquid crystal display device providing four-direction alignment. Hence, residual images are produced or the response speed is inhibited. The liquid crystal display device also has a problem of transmittance loss resulting from provision of the alignment control window together with the spacers. FIG. 9 of Patent Literature 1, for example, illustrates a display device using alignment control windows along two diagonal lines, which provides four-division alignment leading to better display qualities; however, arrangement of spacers on the four sides of each pixel and an alignment control window leads to a large transmittance loss.

Figure 8:
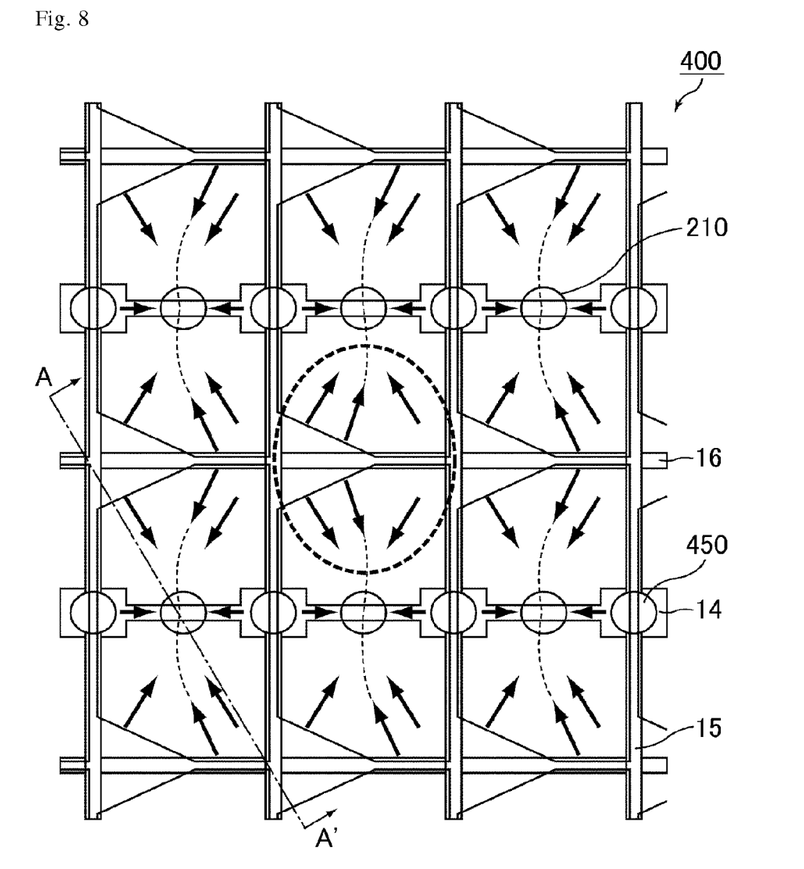
FIG. 8 is a schematic plan view illustrating the structure of the liquid crystal display panel according to a first comparative embodiment.

In terms of preventing the transmittance loss, a liquid crystal display panel have been widely considered to have a single domain structure with a smaller number of alignment controlling objects for alignment division, as a transmission pixel structure in the vertical alignment mode in a high definition region (≥250 PPI [the number of pixels per inch]). Liquid crystal display panels with a single domain structure have advantages that a high pixel aperture ratio is achieved with a smaller number of alignment controlling objects or reduced slit regions, and that the light transmittance and, in the case of semi-transmission liquid crystal display devices, the reflectance (hereinafter, these properties are referred to as "light transmittance and the like") are increased. The single domain structure controlling alignment by a projection, a hole of the counter electrode, or the like arranged at the center of the domain, however, provides a lower liquid crystal alignment controlling force, which leads to a problem that desired display properties cannot be achieved depending on the product specification and the pressing stress. For example, at the borders between the upper and lower pixels at the domain ends in a single domain structure as illustrated in FIG. 8, no object is provided, and the alignment controlling force is not naturally set. To solve the problem, the shape of the pixel electrode can be improved, for example. However, the single domain structure has a large-sized domain compared to a multi-domain structure, and thus provides a relatively low alignment controlling force. Accordingly, a pixel pitch or cell thickness difference or pressing stress may cause misalignment at the borders between the upper and lower pixels. As a result, viewing angle compensation in pixels may not be sufficiently provided, and thus display roughness or color unevenness that can occur depending on the viewing angle is caused to decrease the display qualities. It is also possible to add projections or slits as alignment controlling objects at the borders between the upper and lower pixels at the domain ends, but such addition tends to deteriorate the above-mentioned advantages of a single domain structure that a high light transmittance can be achieved.

As mentioned above, liquid crystal display panels capable of achieving a sufficient transmittance and excellent display qualities have been strongly desired. Particularly, VA-mode, high definition liquid crystal panels for mobiles have been strongly desired which achieve a sufficient transmittance even with small pixel pitches, have excellent pressing stress resistance required for mobile devices, and achieve sufficient display qualities. Such VA mode, high definition liquid crystal panels for mobiles have been increasingly desired to include touch panels as a standard feature, and thus measures to take for the pressing stress are desired more than ever.

The present invention has been made in view of the above state of the art, and aims to provide a liquid crystal display panel that overcomes the weakness of the alignment in conventional single domain structures, improves display qualities (e.g. reduced display roughness, improved viewing angle with reduced color unevenness that can occur depending on the viewing angle) by the liquid crystal alignment controlling force irrespective of the external conditions or environments, increases the response speed, and contributes to reduction of steps (reduction of cost). Also, the liquid crystal display panel has excellent pressing stress resistance, excellent display properties in the case of use under low-temperature atmosphere, and excellent transmittance.

Solution to Problem

The present inventor have made intensive studies on reformation of the pixel structure from the many aspects of design, process, and material in response to the increasing desire for panels for mobiles and touch panels and the desire for a high definition and high transmittance panel. In the vertical alignment mode in a high definition 250 PPI) region, a single domain structure has been widely used as the conventional transmission pixel structure. The present inventor has first focused on the current state that desired display qualities may not be achieved depending on the product specification and the pressing stress in such a conventional single domain structure utilizing a projection or the like arranged at the center of each domain for alignment control. Various studies have been made to enhance the alignment controlling force which has been a problem in liquid crystal display panels in which alignment controlling objects such as the single domain structure have been reduced or omitted. As a result, the present inventor has arrived at a structure in which a spacer projecting toward the liquid crystal layer is arranged at each of the four corners of each pixel which contribute to display at a low level. Such a structure has been found out to solve the above problems by producing an alignment controlling force from the outer side of a pixel toward the center by the spacers arranged at at least four corners, and increasing the aperture ratio of the pixel to achieve a high light transmittance and the like, thereby leading to a liquid crystal display panel that is excellent in display qualities such as the viewing angle. Thereby, the present invention has been completed.

That is, the present invention is a liquid crystal display panel including: a pair of substrates including a pixel electrode and a counter electrode (common electrode); and a liquid crystal layer disposed between the substrates, the liquid crystal display panel including spacers at at least four corners of a pixel defined by the pixel electrode.

The liquid crystal display panel of the present invention has spacers at at least four corners of a pixel defined by the pixel electrode. For example, in the case that a pixel has a shape with four points (e.g., square, rectangle) in a plan view of the substrate surface, spacers may be provided at the four points of the pixel shape or in the vicinity thereof, i.e., at the corners. In the case that the pixel has a polygon shape with more than four points, spacers may be provided at at least four corners of the more than four corners, and every corner may be provided with a spacer. Here, the phrase "pixel defined by the pixel electrode" refers to a pixel at least a part of which is inside the outer edge of the pixel electrode, i.e., a minimum unit that corresponds to one pixel electrode and uses the pixel electrode to provide functions required for display. The spacers are only required to be able to exert the effects of the present invention by controlling the alignment of liquid crystals, and be provided at the points of each pixel or in the vicinity thereof as described above.

The liquid crystal display panel features a structure in which, for example, a pixel is provided with a spacer such as a photo spacer (PS) at every intersection of a source line and a storage capacitor (Cs) line or a gate line, which lines surround the pixel. Such a structure minimizes the aperture loss as described below, and thus increases the transmittance. The structure, together with the spacers provided at at least four corners in the present invention, contributes to improvement of the properties of the liquid crystal display panel used for mobiles, touch panels, or the like.

The liquid crystal display panel has a single domain structure with spacers at at least all the four corners of a pixel, and preferably has a photo spacer (PS) on the pixel electrode layer of the thin-film transistor array substrate (TFT array substrate). Thereby, the liquid crystal display panel not only can naturally set the alignment axis at the borders between the upper and lower pixels by the alignment controlling force of the spacers, but also can match the alignment vector by the spacers to the alignment vector by the pixel electrode edges. For this reason, it is possible to give strong alignment controlling forces in all the directions. Accordingly, the alignment of liquid crystals can be stabilized to achieve wide viewing angle characteristics, and the response speed can also be prevented from decreasing. Thereby, a liquid crystal display device having excellent display properties can be provided. It is also preferable to provide spacers substantially at all the four corners of every pixel.

Here, not every pixel is required to have the structure described herein; it will be sufficient enough if substantially all the pixels have the structure described herein to such an extent that the advantageous effects of the present invention are considered to be achieved.

Also, the above-mentioned conventional technique divides alignment into four directions with pillar spacers (alignment control electrodes) on the four lines of the pixel and two alignment control windows. The present invention requires a spacer at every one of the four corners of a pixel such that the alignment controlling forces of the PSs from the four corners of the domain is very strong. For this reason, the counter (CF) substrate can divide the alignment into four directions using projections (e.g. rivets), holes in ITO as the counter substrate, or no object, increasing the aperture ratio (transmittance). Therefore, a high light transmittance and the like can be achieved, and thereby the visibility can be improved. Accordingly, the concept of the present invention can be more suitably applied to a structure in which the size of pixels is reduced.

In consideration of easiness in the production, the spacers at the corners of each pixel are preferably resin objects. Suitable examples of such resin objects include photo spacers (PSs) that can be formed by, for example, subjecting a photosensitive resin (e.g. acrylic resin) by light exposure such as photolithography. Since the spacers are provided for controlling the alignment of liquid crystals, they usually have a shape projecting toward the liquid crystal layer side.

As described below, spacers such as PSs may not be main spacers for controlling the cell thickness for a measure against impulsive bubbles at low temperatures, but may be sub spacers that are different from the main spacers in height or in shape in a plan view of the substrate surface.

Examples of preferred structures of the liquid crystal display panel of the present invention include a structure in which the pixel electrode is formed on the TFT array substrate. Thereby, the alignment controlling force for liquid crystals can be stronger, and thus the display qualities can be improved. In this structure, electrodes such as gate electrodes connected to the gate lines (scanning lines), source electrodes connected to the source lines (signal lines), drain electrodes connected to the pixel electrodes, and storage capacitor electrodes are usually formed on the substrate. Also, gate lines and source lines are usually arranged to intersect with each other, and thin film transistors (hereinafter also referred to as TFTs) as switching elements and pixel electrodes are arranged. The TFTs have a pixel electrode structure formed from gate electrodes connected to the gate line, source electrodes, spacedly facing gate electrodes, connected to the source line, drain electrodes connected to the pixel electrodes, and an island-shaped semiconductor layer.

Examples of preferred structures of the liquid crystal display panel of the present invention include a structure in which liquid crystal molecules are aligned in a direction perpendicular to the substrate surface when no voltage is applied. Such a vertical alignment mode is a display mode in which liquid crystals (usually negative liquid crystals having negative dielectric constant anisotropy) are aligned in a direction substantially perpendicular to the substrate surface when a voltage lower than a threshold (e.g. no voltage) is applied, whereas the liquid crystal molecules are aligned in a direction substantially parallel to the substrate surface when a voltage not lower than the threshold is applied. The liquid crystal molecules having negative dielectric constant anisotropy refers to liquid crystal molecules having a larger dielectric constant in the short axis direction than that in the long axis direction. The liquid crystal display panel of the present invention employs the vertical alignment mode to achieve a high contrast ratio. The vertical direction may be a direction substantially vertical to the substrate surface to such an extent that the direction is usually considered to be in the vertical alignment mode in the field of liquid crystal panels.

In the liquid crystal display panel of the present invention, the pixel electrode preferably includes the spacers at an intersection of a signal line and a storage capacitor line or an intersection of a signal line and a scanning line. In this case, the structure encompasses a structure in which the spacers in a plan view of the substrate main surface are formed directly above the intersections, and a structure in which the spacers are formed in the vicinity of the intersections to such an extent that the advantageous effects of the present invention can be exerted. The same applies to the intersections of the signal lines as well as the scanning lines and the intersections of the signal lines and the storage capacitor lines.

The liquid crystal display panel preferably divides alignment in a pixel by the spacers provided at at least the four corners of a pixel. More specifically, the liquid crystal display panel does not have projections for alignment division in pixels on the pair of substrates, particularly on the counter substrate, and the spacers at the four corners divide the alignment in one pixel. The present invention can achieve favorable display qualities even with a structure having such a high aperture ratio.

The spacers preferably include a first spacer controlling the thickness of a liquid crystal layer, and a second spacer different in shape from the first spacer. For example, the spacers may include not only the first spacers (main spacers) controlling the liquid crystal layer thickness (cell thickness) but also the second spacers (sub spacers) different in shape from the main spacers, as a measure to take for impulsive bubbles at low temperatures. The main spacers controlling the cell thickness are spacers in contact with both of the pair of substrates (e.g., TFT array substrate and counter substrate). The contact form between the main spacers and the components (e.g. insulating layer) constituting the pair of substrates is not particularly limited as long as they are in contact with each other to such an extent that the cell gap is maintained.

The spacers (main spacers and sub spacers) usually have a pillar shape. Suitable examples of the pillar shape include cylinder, elliptic cylinder, prism, cone, elliptical cone, pyramid, truncated cone, elliptical truncated cone, and truncated pyramid. For example, the case is possible that the main spacers have a truncated cone shape and the sub spacers have an elliptical truncated cone shape. The diameters of the main spacers and the sub spacers are not particularly limited, and may be appropriately set for recognition of the main spacers arranged, or may be set depending on the pressing stress resistance, or the like. The main spacers and the sub spacers may have a diameter that is the same as or different from each other. Examples of the main spacers and the sub spacers include main spacers having a truncated cone shape with a bottom surface diameter of 8 μm to 12 μm and an upper surface diameter of 4 μm to 6 μm; and sub spacers having an elliptical cone shape with a bottom surface major axis of 12 μm to 20 μm, a bottom surface minor axis of 8 μm to 12 μm, an upper surface major axis of 6 μm to 10 μm, and an upper surface minor axis of 4 μm to 6 μm.

The heights of the spacers (main spacers and sub spacers) are not particularly limited, and the height of the sub spacers is preferably lower than that of the main spacers by 0.2 μm to 0.7 μm in terms of the trade-off between the impulsive bubbles and pressing stress at low temperatures. For example, in the case that the liquid crystal display panel is produced by a liquid crystal filling (one drop filling) method, securing such a height difference between the main spacers and the sub spacers can make the difference in the elasticity between the sub spacers and the counter substrate small when the liquid crystal display panel is under a low-temperature atmosphere or when an impulse or pressing stress is applied to the display panel. Also in this case, distortion of the counter substrate is followed by distortion of the sub spacers. For this reason, fine gaps are not easily formed between the sub spacers and the counter substrate, which makes it possible to suppress generation of bubbles.

When the height difference between the main spacers and the sub spacers is too small, application of the pressing stress or the like increases the difference in the elasticity between the sub spacers and the counter substrate, not easily allowing the sub spacers to be distorted when the counter substrate is distorted. Therefore, fine gaps or the like can be easily formed between the sub spacers and the counter substrate, which may result in generation of bubbles. In the case that the height difference is too large, however, external pressing stress does not easily allow the sub spacers to come into contact with the counter substrate, reducing the effect of buffering the pressing stress.

In the case that two or more kinds of spacers different in shape (e.g. in length, diameter) are used as the main spacers, one kind of the spacers in contact with both of the pair of substrates may be used as the main spacers, and the other kind(s) of the spacers may be used as spacers different in shape from the main spacers. More specifically, in the case of using spacers in contact with both of the pair of substrates and spacers in contact with either one of the pair of substrates (e.g. spacers that are not in contact with the counter substrate, and are lower in height than the spacers in contact with both of the pair of substrates), the spacers in contact with both of the pair of substrates are the main spacers, and the spacers not in contact with both of the pair of substrates are the sub spacers. In the case that two or more kinds of spacers are in contact with both of the pair of substrates (e.g. in the case that there are elliptical spacers with a small long axis and elliptical spacers with a large long axis), one kind of the spacers may be used as the main spacers, and the other kind(s) of the spacers may be used as the sub spacers.

The liquid crystal display panel include the main spacers in contact with the counter substrate and the sub spacers not in contact with the counter substrate, and it is particularly preferable that the spacers at at least four corners of the pixel include the main spacers and the sub spacers. Such a structure with the main spacers, which are in contact with the counter substrate to form the thickness of the cell gap, achieves the effect of maintaining the cell gap between the TFT array substrate and the counter substrate and the effect of buffering the external pressing stress to reduce breakage or the like of the liquid crystal display device. The sub spacers have the effect of buffering external pressing stress. They have a height slightly smaller than the pillar spacers (main spacers) so as not to come into contact with the counter substrate, and they come into contact with the counter substrate when the gap between the substrates is made smaller by external pressing stress. Such a structure shows increased resistance to pressing stress, and thus enables to maintain excellent display qualities.

The main spacers and the sub spacers may be separately formed, but are preferably formed at the same time in terms of reducing the production step and the production cost. Examples of the method of forming the main spacers and the sub spacers at the same time include half-tone exposure, gray tone exposure, and double exposure. Particularly, half-tone exposure and gray tone exposure are preferred. In the case of the half-tone exposure, for example, the relative transmittance in the half-tone region is set to about 10% to 30%.

The common electrode in the present invention may have an alignment controlling object, which serves as the center of alignment, at around the center of each pixel in a plan view of the substrate main surface. Examples of the alignment controlling object include holes made in the common electrode. Such an alignment controlling object can regulate the alignment of liquid crystals without deteriorating the aperture ratio or transmission contrast.

Examples of the structure of the liquid crystal display panel of the present invention include one in which the spacers are narrower on the counter substrate side than on the TFT array substrate side. Although the spacers are formed by, exposure as described above, for example, the resulting shape may be one that is tapered toward the end surface. Thereby, in terms of alignment control, alignment vector toward the center of the domain is provided as in the case of a projection is provided, which gives a stronger alignment controlling force.

Examples of the structure of the liquid crystal display panel of the present invention include a transmission type and a transflective type. The transmission type and the transflective type both control the alignment using alignment controlling objects such as the photo spacers at the four corners and the slits around the pixel electrode. For example, the electric potential difference produced between the pixel electrode and the slit therearound upon voltage switching induces inclination of liquid crystals, and an alignment vector inclining from the end of the pixel electrode to the center of the domain is provided. Arranging photo spacers to the four corners produces an alignment vector in the same direction to enhance the alignment. In terms of suitably exerting the advantageous effects of the present invention, transmission type liquid crystal display panels are particularly preferred. The use thereof is not particularly limited, but a suitable example is a high definition, high transmittance mobile display panel mounted on cell phones, personal digital assistants (PDA such as PDA phones), digital still cameras (DSCs), and the like, and a particularly suitable example is a mobile display panel mounted with a touch panel as a standard feature.

Another aspect of the present invention is a liquid crystal display device including the liquid crystal display panel of the present invention. A suitable structure of the liquid crystal display device of the present invention is the same as the suitable structure of the liquid crystal display panel of the present invention mentioned above, and thus the liquid crystal display device can exert the above-mentioned advantageous effects of the liquid crystal display panel of the present invention.

The liquid crystal display panel and liquid crystal display device of the present invention may be provided with the above-mentioned necessary spacers at at least four corners, preferred components, and other components constituting the liquid crystal display panel and liquid crystal display device; here, the other components are not particularly limited.

The above structures may be appropriately combined as long as the combination does not go beyond the scope of the present invention.

Advantageous Effects of Invention

The liquid crystal display panel of the present invention has an enhanced liquid crystal alignment controlling force irrespective of the external conditions or environments. The enhanced liquid crystal alignment controlling force sufficiently prevents display roughness or color unevenness that can occur depending on the viewing angle, so that favorable display qualities and excellent transmittance can be achieved.

DESCRIPTION OF EMBODIMENTS

The present invention will be described in more detail below with reference to the drawings based on embodiments which, however, are not intended to limit the scope of the present invention. In each of the embodiments and the comparative embodiment, components and portions providing the same functions are given the same symbols.

First Embodiment

Figure 1:
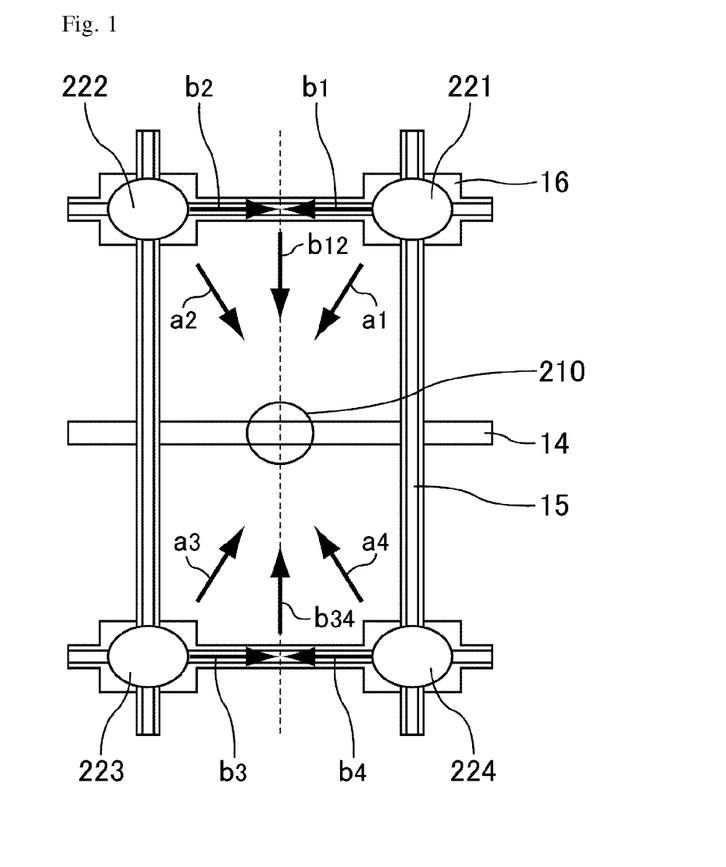
FIG. 1 is a schematic plan view illustrating the structure of a pixel in a liquid crystal display panel according to a first embodiment.

FIG. 1 is a schematic plan view illustrating the structure of pixels in the liquid crystal display panel according to a first embodiment of the present invention.

In FIG. 1, pixels of the liquid crystal display panel according to the first embodiment, on a TFT array substrate with pixel electrodes formed thereon, extend over all the intersections of source lines 15 and Cs lines 16, which lines surround the pixels. At the corners of the pixel, photo spacers (hereinafter, also referred to as PSs) 221, 222, 223, and 224 are formed as alignment controlling objects for controlling the alignment of liquid crystals. In other words, in the first embodiment, every pixel includes the PSs 221, 222, 223, and 224 at all the intersections of the source lines 15 and the Cs lines 16, which lines surround the pixels.

The PSs 221, 222, 223, and 224 give liquid crystals the alignment controlling forces from the corners of a pixel toward the center of the pixel. The arrows $a_1$ to $a_4$, $b_1$ to $b_4$, $b_{12}$, and $b_{34}$ in FIG. 1 roughly illustrate the directions of the alignment controlling forces on the liquid crystals in the pixel. The arrows $a_1$ to $a_4$ in FIG. 1 indicate that alignment controlling forces from the PSs 221, 222, 223, and 224 at the four corners of the pixel toward the center of the pixel control the alignment of liquid crystals to four directions. Here, the alignment vectors provided by the PSs collide with each other ($b_1$ and $b_2$ collide with each other, and $b_3$ and $b_4$ collide with each other). Since there is almost no difference in controlling forces between the two PSs, an alignment axis center is naturally formed at the centers of the borders between the upper and lower pixels (at the short sides of the pixel) (that is, $b_{12}$ is formed from $b_1$ and $b_2$, and $b_{34}$ is formed from $b_3$ and $b_4$). In the first embodiment, the viewing angle compensation in the pixels is maintained by the controlling forces of the PSs and the balance between the forces, regardless of external factors.

The PSs 221, 222, 223, and 224 are not necessarily in contact with the pixel electrode. The arrangement of the PSs 221, 222, 223, and 224, particularly, does not essentially depend on the shape of the pixel electrode, and the pixel electrode around the PSs may be notched.

The peripheral portions of the PSs 221, 222, 223, and 224 cause light leakage followed by alignment disorder, which requires at least the minimum light shielding. Meanwhile, formation of storage capacitor (Cs) in one pixel via a gate insulating film is required. Since both of the PS peripheral portions and Cs portions are usually closed regions, allowing the light shielding portions of the PS peripheral portions to overlap the Cs portions as illustrated in the first embodiment can minimize the aperture loss. In the liquid crystal display panel according to the first embodiment, gate lines 14 are formed to pass through the centers of the respective long sides of the pixel.

The PSs 221, 222, 223, and 224 are formed from photosensitive acrylic resin by photolithography, for example. Suitable examples thereof include, but not particularly limited to, pillar shapes such as cylinder, elliptic cylinder, prism, cone, elliptical cone, pyramid, truncated cone, elliptical truncated cone, and truncated pyramid.

Figure 2:
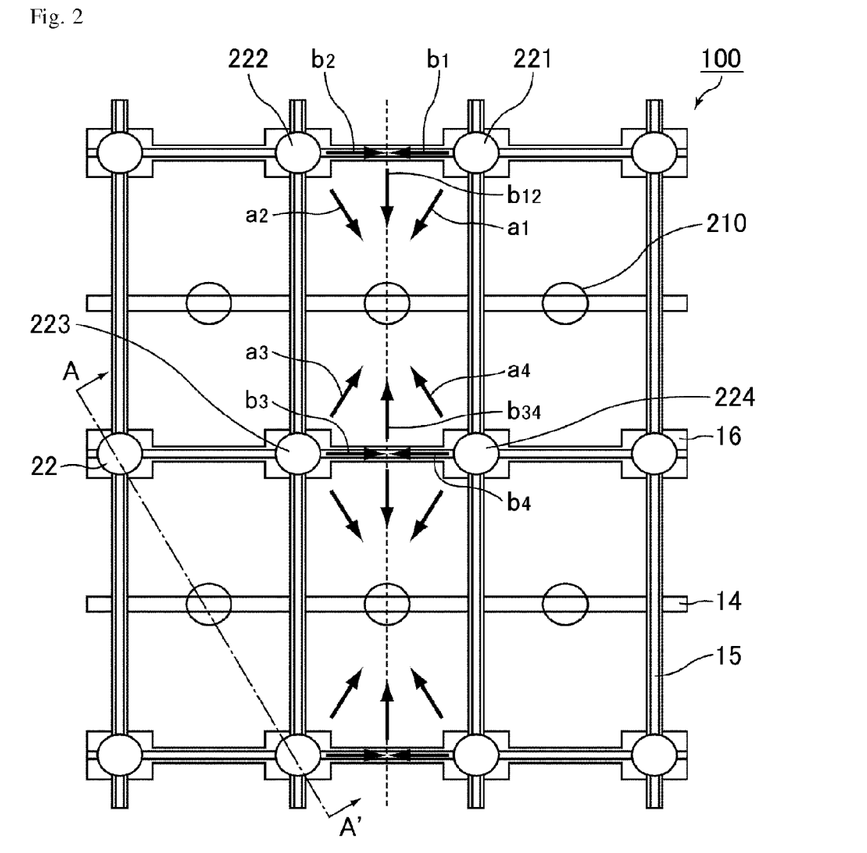
FIG. 2 is a schematic plan view illustrating the structure of the liquid crystal display panel according to the first embodiment.
Figure 3:
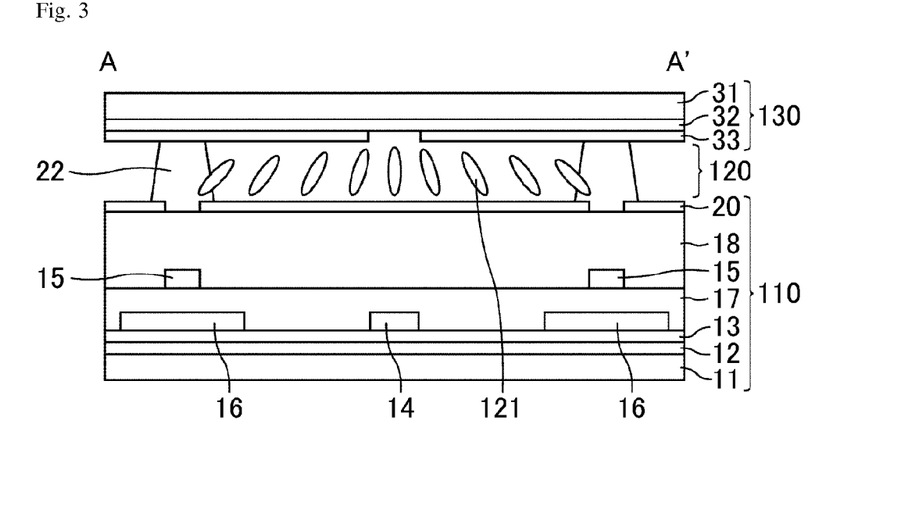
FIG. 3 is a schematic cross-sectional view taken along the A-A' line for the liquid crystal display panel in FIG. 2.

FIG. 2 is a schematic plan view illustrating the structure of the liquid crystal display panel according to the first embodiment of the present invention. FIG. 3 is a schematic cross-sectional view taken along the A-A' line of the liquid crystal display panel illustrated in FIG. 2. Each of the pixels illustrated in FIG. 2 which has the same structure as the pixel in FIG. 1 is given the same symbol to omit the explanation.

The liquid crystal display panel 100 according to the first embodiment in FIG. 2 and FIG. 3 is a transmission liquid crystal display panel that has a TFT array substrate 110, a liquid crystal layer 120, and a counter substrate 130 in the stated order. Each pixel of the liquid crystal display panel 100 has the PS 22, which is an alignment controlling object for controlling the alignment of liquid crystals at the corners of each pixel, on a resin layer 18 of the TFT array substrate 110 in such a manner that the PS22 projects toward the liquid crystal layer 120 side. The PS22 is provided to be in contact with both of the TFT array substrate 110 and the counter substrate 130, whereby the gap between the TFT array substrate 110 and the counter substrate 130, i.e., a cell gap, can be maintained to a desired thickness. Therefore, the PS22 according to the first embodiment serves as a main spacer for maintaining the cell gap in the liquid crystal display panel.

Regarding the TFT array substrate, the resin film formed on the main surface of the liquid crystal layer side of the supporting substrate is, for example, a resin film constituting a super high aperture (SHA) structure. A liquid crystal display panel having an SHA structure has an insulating film formed from a special resin on lines of the TFT array substrate and has a pixel electrode on the insulating film, so as to increase the aperture ratio and achieve bright display.

In the liquid crystal display panel 100 according to the first embodiment, the alignment film (not illustrated) formed on the surfaces of the TFT array substrate 110 and the counter substrate 130 which are in contact with the liquid crystal layer 120 also align the liquid crystal molecules 121 from the PSs 221, 222, 223, and 224 at the four corners of the pixel toward the center of the pixel. Addition of the alignment controlling force by the PS 22 to such an alignment state produces strong alignment controlling forces from all the directions in each pixel. Accordingly, the liquid crystal molecules 121 can be aligned in a favorable, stable state.

The PS 22 may have a shape that is narrower on the counter substrate 130 side than on the TFT array substrate 110 side as illustrated in FIG. 3, in the case of being formed from a photosensitive resin by photolithography. Such a shape of the PS 22 gives a more sufficient alignment vector toward the center of the domain, providing sufficient alignment controlling forces to the liquid crystals. Therefore, it is suitable to form the PS22 on the TFT array substrate 110 side in the present invention.

The TFT array substrate 110 has a base coat film 12 and a gate insulating film 13 formed on the main surface of the supporting substrate 11 made of an insulating substrate such as a glass substrate. On the gate insulating film 13, gate lines 14 and source lines 15 are arranged in a lattice shape. Although not illustrated, at around the intersections of the gate lines 14 and the source lines 15, TFTs are formed. The TFTs are formed from gate electrodes connected to a gate line, source electrodes, spacedly facing gate electrodes, connected to a source line, drain electrodes connected to a pixel electrode, and an island-shaped semiconductor layer. A Cs line 16 is formed between the adjacent gate lines 14, and an interlayer film 17 which is an insulating film, a resin film 18, and pixel electrodes 20 are formed to cover the Cs lines 16, in such a manner that what is called a super high aperture (SHA) structure is formed.

The counter substrate 130 has a color resin layer 32 and a common electrode 33 in the stated order on the main surface of the supporting substrate 31 made of an insulating substrate such as a glass substrate. The color resin layer 32 consists of colors of red (R), green (G), and blue (B). The color resin layer 32 usually includes a light shielding component, and further includes a black matrix (not illustrated) for preventing the colors from being mixed at the borders of the colors. A black matrix is formed in a stripe shape in such a manner as to overlap the source lines 15 in a plan view of the main surface of the substrates (when the substrate surface is seen from the normal direction). The black matrix is arranged to overlap the source lines 15 only in a stripe shape mainly for the purpose of preventing from mixing of colors at the borders between the colors of the color resin layer on the counter substrate side. In the regions overlapping the gate lines 14 or the Cs lines 16, no color mixing occurs, and therefore no black matrix is arranged.

The liquid crystal display panel 100 according to the first embodiment has a single domain structure as described above. Thereby, the aperture ratio of the pixels can be increased, and a high light transmittance in the transmission display region can be achieved.

The liquid crystal display panel 100 having the above structure can be produced through the following steps, for example. First, the TFT array substrate 110 is described. The base coat film 12 and the gate insulating film 13 were formed in such a manner to cover the main surface of the supporting substrate 11 made of a glass substrate. Subsequently, the gate lines 14 and the Cs lines 16 were formed into desired shapes, and an interlayer film 17 (insulating film) was formed in such a manner to cover these lines. Subsequently, the source lines 15 were formed on the interlayer film 17. Thereby, TFTs (not illustrated) with the desired shape were formed. The resin film 18 was formed to cover the source lines 15. Here, the resin layer 18 was formed at the number of spins of 900 rpm to 1000 rpm to a thickness of 2.5 μm to 3.0 μm.

On the resin film 18, pixel electrodes 20 made of indium tin oxide (ITO) were formed by patterning ITO into a desired shape.

Photosensitive transparent acrylic resin was applied thereon, and the PSs 22, 221, 222, 223, and 224 were formed by photolithography. The PSs 221, 222, 223, and 224 were formed at the four corners of a pixel where they overlap the black matrix in a plan view of the main surface of the substrate in the state that the substrate is attached to the counter substrate 130. The PSs 22, 221, 222, 223, and 224 were formed from a transparent resin (photosensitive resin) by photolithography.

A polyimide resin was applied to cover the entire substrate surface, whereby an alignment film (not illustrated) was formed. Thereby, a TFT array substrate 110 was obtained.

In contrast, regarding the counter substrate 130, a color resin layer 32 having a thickness of 2.0 micrometers to 2.8 micrometers including a color resin (CF layer) and a black matrix was formed on the main surface of the supporting substrate 31 made of a glass substrate. A CF layer includes color films of R (red), G (green), and B (blue), and the black matrix was formed at the border of the colors.

A common electrode 33 having a thickness of 800 Å to 1500 Å was formed to cover the obtained color resin layer 32. A polyimide resin was applied in such a manner to cover the entire substrate surface, so that an alignment film (not illustrated) was formed. Thereby, the counter substrate 130 was obtained.

The PS 22 formed on the TFT array substrate 110, which is attached to the counter substrate 130, is arranged at the positions where the PS 22 overlaps the black matrix, i.e., at the borders with the color resin layer 32. Between the color resin layer 32 and the common electrode 33, an overcoat film may be further formed.

The TFT array substrate 110 and the counter substrate 130 formed as described above were attached to each other by a sealing material such that the alignment films of the substrates face each other. Liquid crystals were injected between the substrates, so that a liquid crystal layer 120 was formed. The liquid crystal layer 120 had a thickness of 3.0 μm to 3.6 μm.

In the first embodiment, the PSs formed on the TFT array substrate side have a tapered shape toward the counter substrate side (i.e., shape of the base on the TFT array substrate side>shape on the receiving side of the counter substrate). Thereby, in terms of alignment control, a sufficient alignment vector toward the center of the domain which is similar to the case of providing projections is provided.

The alignment vector agrees with the vector from the ends of pixel electrodes (from the borders between the upper and lower/right and left pixels in FIGS. 1 and 2) toward the center of the domain without competing. That is, the greatest feature of the first embodiment is that strong alignment controlling forces are achieved by intentionally arranging the PSs at the four corners of the pixel to enforce the alignment control.

Forming the PSs on the counter substrate side without changing the arrangement positions in the pixel leads to a vector in the reverse direction of the above alignment vector, which competes with the alignment vector from the ends of the pixel electrodes. Thereby, alignment disagreement in pixels occurs to decrease the display qualities. From this viewpoint, it is preferable to form PSs on the TFT array substrate side.

In the first embodiment, the common electrode 33 of the counter substrate 130 has holes 210 as illustrated in FIG. 1 to FIG. 3. The holes 210 may not be provided (may have no objects), and other alignment controlling objects may be formed on the counter substrate 130 side in place of the holes 210 or in addition to the holes 210. Examples of the alignment controlling objects include projections such as rivets, and slits formed on the common electrode 33.

The conventional single domain structure has no objects at the borders between the upper and lower pixels, and thus has potential weakness that the alignment is not easily controlled. There has been a concern that a further decrease in the alignment controlling force caused by external factors such as pressing tends to generate alignment disagreement at the borders between the upper and lower pixels, disabling viewing angle compensation in the pixels to cause a decrease in display qualities such as display roughness and color unevenness that can occur depending on the viewing angle. The feature of the first embodiment is that a strong alignment controlling force can be achieved in every direction for the following reasons. That is, arrangement of the PSs 221, 222, 223, and 224 at the four corners on the TFT array substrate side in every pixel forms an alignment axis center at the center of the borders between the upper and lower pixels by a strong alignment controlling force of PSs. Also, the vector provided by the PSs agrees with the alignment vector from the pixel electrode ends on the TFT array substrate side toward the center of the domain.

The liquid crystal panel of the first embodiment achieves favorable display qualities (prevents display roughness and color unevenness that can occur depending on the viewing angle) including the viewing angle by overcoming the disadvantages (enhancement of the alignment controlling force irrespectively of the external conditions or environments) of the conventional single domain structure, and increases the response speed.

Since the alignment controlling force in the liquid crystal display panel 100 of the first embodiment is strong compared to the conventional technique, projections are not required on the counter substrate side, and sufficient alignment division into four directions can be achieved even without objections (structure without alignment controlling objects, slits, or holes in ITO as the counter substrate for controlling alignment of liquid crystals). Thereby, a wide viewing angle and an increased response speed can be achieved, whereby favorable display qualities can be obtained. A structure without objects is preferable in that a sufficient alignment controlling force can be achieved even without objects, and the aperture ratio of the pixel can be increased, whereby a sufficient transmittance can be achieved. Also, object formation on the counter substrate 130 side can be omitted differently from common liquid crystal display panels, which allows simplification of the production steps and reduction in the production cost. That is, the strong alignment controlling forces by the PSs may eliminate commonly used objects at the center of the domain, and sufficient display qualities can be achieved even without holes in ITO as the counter substrate or other objects. Hence, reduction of steps (reduction of cost) can be achieved in the first embodiment.

As described above, the liquid crystal display panel 100 has the holes 210 at the center of each pixel on the common electrode 33 in view of the substrate main surface. Such a structure provides alignment controlling forces that control alignment of liquid crystal molecules 121 from the peripheral portions of the holes 210 toward the holes 210 in the pixels. Accordingly, liquid crystals can be aligned in a more stable manner. The holes 210 formed on the common electrode 33 in the first embodiment are also regarded as alignment controlling objects as the alignment center of the liquid crystals since the holes 210 provide alignment controlling forces towards the holes 210. The liquid crystal display panel of the first embodiment employs negative liquid crystals with negative dielectric constant anisotropy, and aligns the liquid crystal molecules in a direction substantially perpendicular to the substrate surface when a voltage lower than a threshold value is applied (e.g. when no voltage is applied), while it inclines the liquid crystal molecules in a direction substantially horizontal to the substrate surface when a voltage same as or higher than a threshold value is applied.

Voltage switching inclines the liquid crystal molecules, but the borders between the upper and lower pixels in the conventional single domain structure, particularly, are farthest from the center of the domain, and thus the alignment controlling force is comparatively weak. Therefore, the response speed of liquid crystal molecules to be inclined to the desired degree is slow, which affects the response speed as a whole. Addition of PSs with strong alignment controlling forces as described in the first embodiment to the borders increases the inclination speed of the liquid crystal molecules at the time of voltage switching, and thus the response speed can be increased even if the domain size is large.

A liquid crystal display device provided with the liquid crystal display panel of the first embodiment mentioned above can appropriately include the components (e.g. light source such as backlight) that common liquid crystal display devices have. The same applies to the embodiments described below.

Second Embodiment

Figure 4:
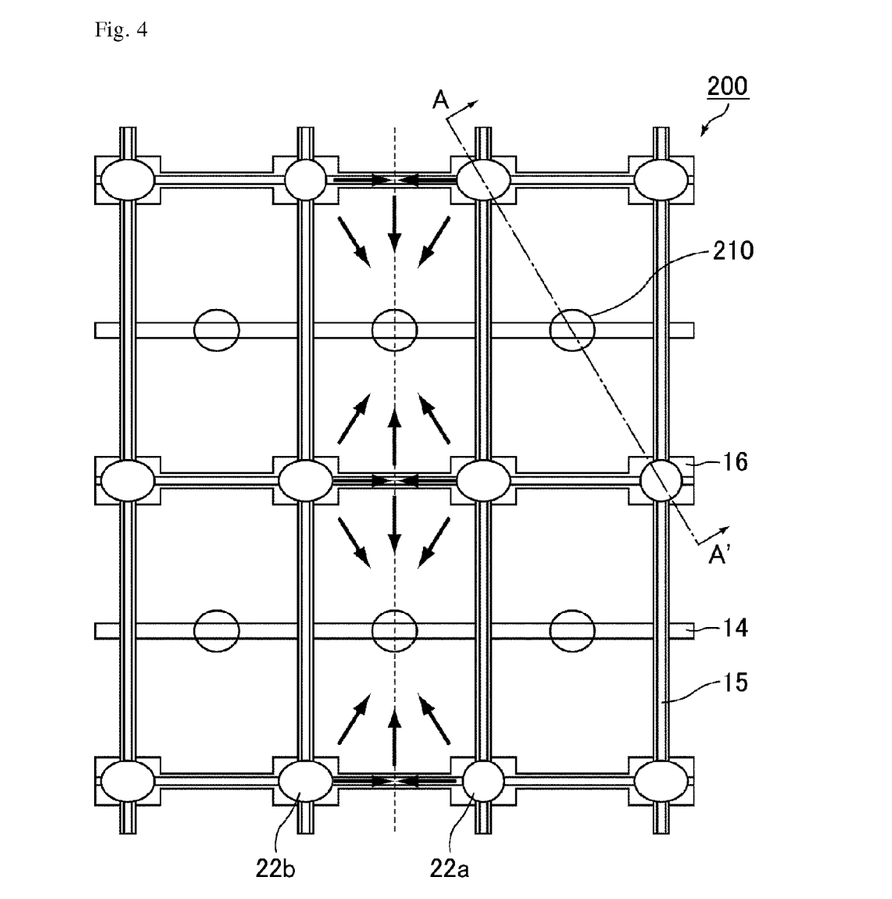
FIG. 4 is a schematic plan view illustrating the structure of the liquid crystal display panel according to a second embodiment.
Figure 5:
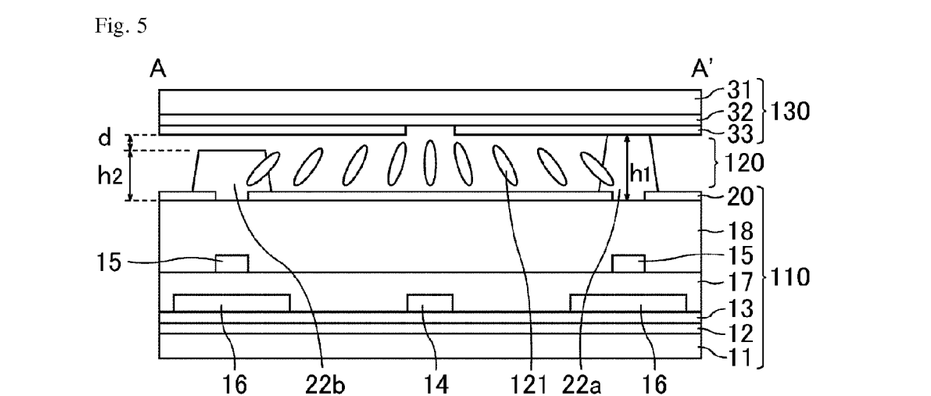
FIG. 5 is a schematic cross-sectional view taken along the A-A' line for the liquid crystal display panel illustrated in FIG. 4.

The present embodiment describes an example in which the PSs include both the main spacers (hereinafter also referred to as main PSs) and sub spacers (hereinafter also referred to as sub PSs) in addition to the structure of the first embodiment, based on FIG. 4 and FIG. 5. FIG. 4 is a schematic plan view illustrating the structure of the liquid crystal display panel according to the second embodiment. FIG. 5 is a schematic cross-sectional view taken along the A-A' line of the liquid crystal display panel illustrated in FIG. 4. Each of the components having the same structure as that in the first embodiment is given the same symbol to omit the explanation.

The liquid crystal display panel 200 illustrated in FIG. 4 and FIG. 5 have a main PS 22a the upper surface of which is in contact with the counter substrate 130, and a sub PS 22b which is not in contact with the counter substrate 130 in addition to the structure of the first embodiment. In this way, part of the PSs may be sub PSs not contributing to the cell thickness (may be sub PSs different in height or shape from the main PSs), for securing the margin for generation of shock bubbles at low temperatures.

The main PSs 22a each have a truncated cone shape with a bottom surface diameter of 8 µm to 12 µm and an upper surface diameter of 4 µm to 6 µm. The sub PSs 22b each have an truncated cone shape with a bottom surface major axis of 12 µm to 20 µm, a bottom surface minor axis of 8 µm to 12 µm, an upper surface major axis of 6 µm to 10 µm, and an upper surface minor axis of 4 µm to 6 µm. The height h2 of the sub PSs 22b is lower than the height h1 of the main PSs 22a as illustrated in FIG. 5, and a gap d is provided between the sub PSs 22b and the counter substrate 130. The height h2 of the sub PSs 22b is preferably lower than the height h1 of the main PSs 22a by 0.2 µm to 0.7 µm.

The liquid crystal display panel 200 having such a structure usually has the main PSs 22a and the counter substrate 130 in contact with each other, and the counter substrate 130, when bended by the pressing stress, comes into contact with the sub PSs 22b to reduce the pressing stress, and thereby the liquid crystal display panel 200 excellent in pressing stress resistance can be achieved. In this case, under the low-temperature atmosphere, the difference in elasticity between the PSs and the counter substrate 130 is smaller (bending of the counter substrate is followed by bending of the photo spacers, not likely to produce fine gaps between these) than in the case that every PS is a main PS. Hence, bubbles are not likely to be produced when a low temperature shock is applied to the panel surface.

In the second embodiment, the main PSs 22a and the sub PSs 22b may be formed separately, but are preferably formed simultaneously at the same step regarding production efficiency. Examples of the method for simultaneously forming the main PSs 22*a* and the sub PSs 22*b* include applying a photosensitive material on the resin film 18, setting the relative transmittance in the half tone region to about 10% to 30%, and exposing the photosensitive material using a half tone mask. Exposure treatment using a gray tone mask, as well as exposure using a half tone mask, is also applicable.

The sub PSs 22*b* may be different not only in height but also in shape from the main PSs 22*a*.

The technique for aligning the liquid crystals in the present invention may be a polymer sustained alignment (PSA) technique, i.e., a method of mixing a polymerizable component (e.g. monomer, oligomer) into the liquid crystals; polymerizing the polymerizable component in the state that liquid crystal molecules are inclined by voltage application to the liquid crystals; and thereby providing a polymer for inclining the liquid crystals to a certain direction, on the substrate.

As above, the second embodiment employs the same structure as the first embodiment, except that the PSs formed at the four corners of a pixel include not only the main PSs for controlling the cell thickness but also the sub PSs different in height or shape from the main PSs, in consideration of margins for impulsive bubbles at low temperatures and the like. The present invention may employ the structure of the second embodiment.

Each pixel in the second embodiment has a PS at every intersection of the source line 15 and the Cs line 16 which define the pixel, in the same manner as in the first embodiment. Also, the alignment vectors of the PSs collide with each other as illustrated in FIG. 4, in the same manner as in the first embodiment. Here, almost no controlling force difference between the two PSs naturally leads to formation of an alignment axis center at the centers of the borders between the upper and lower pixels. The controlling forces provided by the PSs and the balance of the forces maintain the viewing angle compensation in pixels irrespective of external factors.

The first and second embodiments were described based on the example in which the PS 22 was formed in the vicinity of an intersection of the source line 15 and the Cs line 16. The present invention is not limited to this example, and the PS may be formed in the vicinity of an intersection of the gate line 14 and the source line 15 in the case that a pixel is defined by the gate line 14 and the source line 15. For example, the sub PSs 22*b* can be formed in the liquid crystal display panel 300 according to the below-described third embodiment, and such a structure also achieves the same effects.

Third Embodiment

Figure 6:
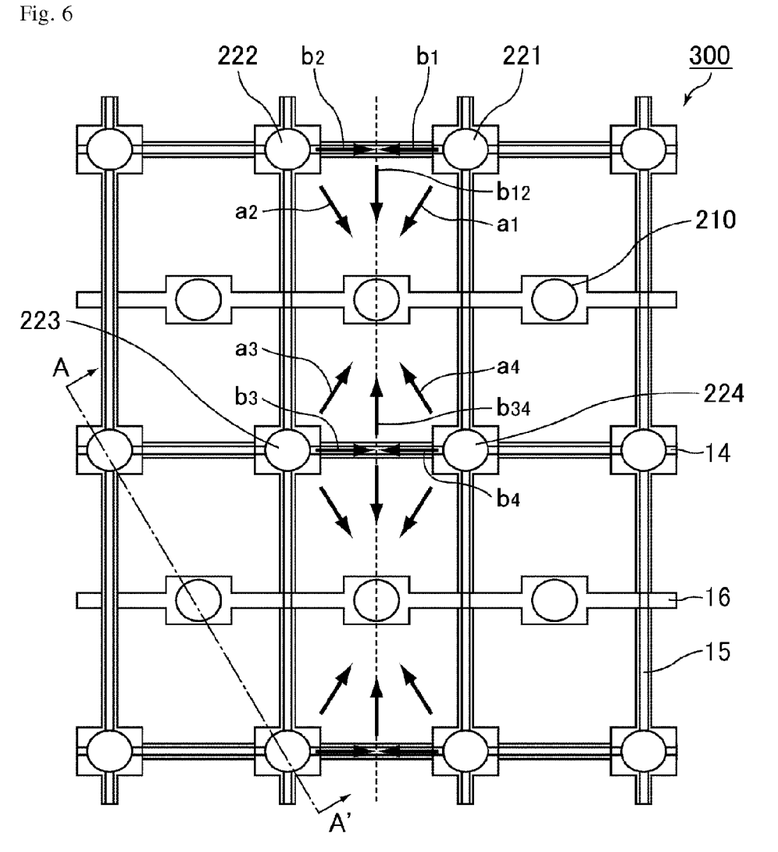
FIG. 6 is a schematic plan view illustrating the structure of the liquid crystal display panel according to a third embodiment.
Figure 7:
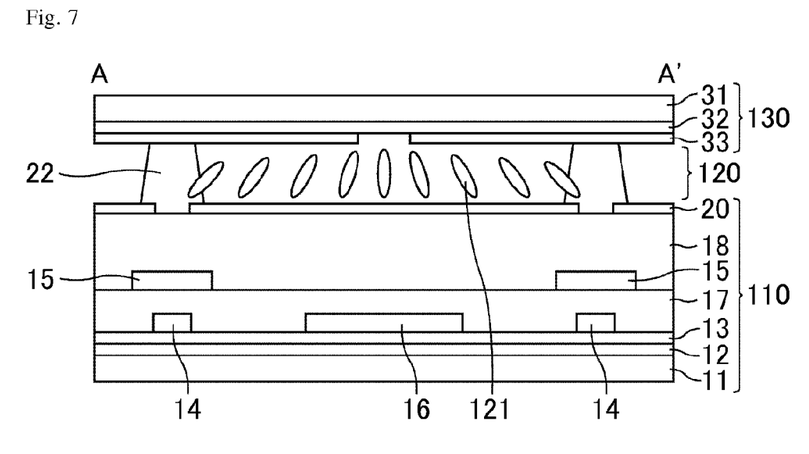
FIG. 7 is a schematic cross-sectional view taken along the A-A' line for the liquid crystal display panel illustrated in FIG. 6.

FIG. 6 is a schematic plan view illustrating the structure of the liquid crystal display panel according to the third embodiment. FIG. 7 is a schematic cross-sectional view taken along the A-A' line of the liquid crystal display panel illustrated in FIG. 6. In the third embodiment, a pixel is defined by the gate line 14 and the source line 15.

In the third embodiment, the TFT elements and the lines are formed on the TFT array substrate 110. On the TFT elements and the lines, a resin film is formed to give an SHA structure as in the first and second embodiments. A photo spacer (PS) is formed at each of the four corners of every pixel on the resin film (at every intersection of the gate line 14 and the source line 15 which define the pixel, in the present embodiment).

The first embodiment has an advantage that the aperture loss can be minimized, but has light shielding portions for light leakage of the PS peripheral portions at the intersections of the source lines 15 and the Cs lines 16, which is concerned to enlarge the area of the intersections and delay the Cs signals to deteriorate the cross talk qualities.

Hence, the third embodiment employs a structure in which the gate lines 14 pass through the four corners of a pixel where the PSs 221, 222, 223, and 224 are arranged, and light shielding for the light leakage in the PS peripheral portions is performed by a structure with the source lines 15 the width of which is increased as shown in FIG. 6. The structure enables to reduce the area of intersections of the source lines 15 and the Cs lines 16, and therefore the display qualities regarding the alignment can be increased or a cross talk resulting from the Cs signal delay can be prevented.

In the third embodiment, the alignment vectors of the PSs collide with each other as in the first and second embodiments, and the almost no controlling force difference between the two PSs naturally leads to formation of an alignment axis center at the centers of the borders between the upper and lower pixels. The controlling forces provided by the PSs and the balance of the forces maintain the viewing angle compensation in pixels irrespective of external factors.

First Comparative Embodiment

Figure 9:
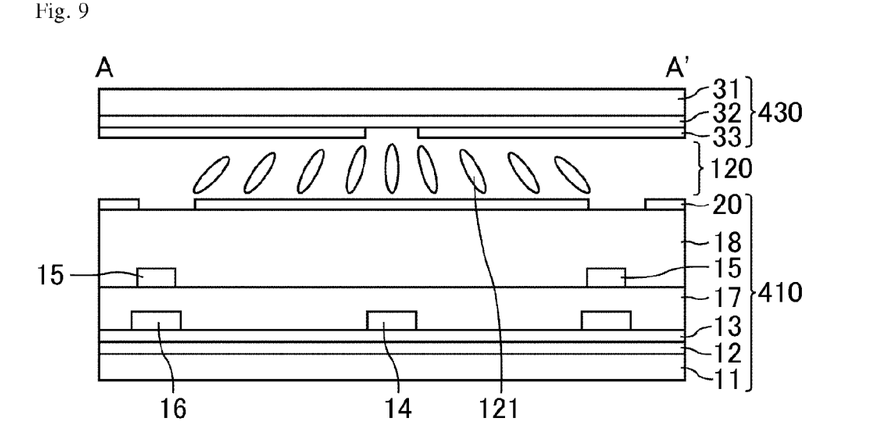
FIG. 9 is a schematic cross-sectional view taken along the A-A' line for the liquid crystal display panel illustrated in FIG. 8.

Hereinafter, the structures of the liquid crystal display panel according to the first comparative embodiment are described based on FIG. 8 and FIG. 9. FIG. 8 is a schematic plan view illustrating the structure of the liquid crystal display panel according to the first comparative embodiment. FIG. 9 is a schematic cross-sectional view taken along the A-A' line of the liquid crystal display panel illustrated in FIG. 8. Each of the components having the same structure as those in the first embodiment is given the same symbol to omit the explanation.

The liquid crystal display panel 400 illustrated in FIG. 8 and FIG. 9 is a liquid crystal display panel having a single domain structure, and the TFT array substrate 410 does not have PSs at the corners of a pixel in a plan view of the substrate main surface. Instead, the TFT array substrate 410 has a main PS 450 for maintaining a gap between the TFT array substrate 410 and the counter substrate 430 at the centers of the long sides of each pixel.

The region defined by the dots in FIG. 8 has a low alignment controlling force at the borders of upper and lower pixels, and is thus susceptible to external factors. The liquid crystal layer 120 is affected by external factors such that the alignment is controlled in the directions of arrows, for example. Such a liquid crystal display panel cannot achieve sufficient display qualities. The liquid crystal display panel 400 illustrated in FIG. 8 produces local alignment disagreement caused by external factors (alignment disagreement with another pixel caused by external factors) in the portion defined by the dotted line, and the alignment vectors are not the same in all the pixels.

In this way, the conventional single domain structure has no objects at the borders of the upper and lower pixels at the domain ends, and thus the alignment control is not naturally set, which has been a potential weakness. Therefore, a decrease in the controlling force caused by a pixel pitch or cell thickness difference, or an external factor such as pressing tends to lead to alignment disagreement at the borders between the upper and lower pixels. As a result, viewing angle compensation in the pixels is not sufficiently provided, whereby the display qualities are decreased (display roughness and color unevenness that can occur depending on the viewing angle are caused).

FIG. 8 illustrates pixel electrodes of which the upper left portion and the lower left portion are cut. The alignment controlling force of the pixel electrode having such a shape is not sufficient either and is affected by external factors, as in the case of the liquid crystal display panel having rectangular-shaped pixel electrodes which are not cut (embodiment in which the pixel electrode shape is the same as in the first to third embodiments).

As described above, the liquid crystal display panel of the present invention (the liquid crystal display panel according to any of the first to third embodiments) achieves high liquid crystal alignment control by the PSs arranged at the four corners of a pixel to provide favorable display qualities and maintain a high pixel aperture ratio, which leads to a liquid crystal display device with a high response speed. Particularly suitable applications thereof are cell phones, personal digital assistants (e.g. PDA phone), and digital still cameras (DSC).

The above structures in the embodiments may be appropriately combined as long as the combination does not go beyond the scope of the present invention.

The present application claims priority to Patent Application No. 2010-095101 filed in Japan on Apr. 16, 2010 under the Paris Convention and provisions of national law in a designated State, the entire contents of which are hereby incorporated by reference.

EXPLANATION OF SYMBOLS 11, 31 Supporting substrate
12 Base coat film
13 Gate insulating film
14 Gate line
15 Source line
16 Cs line
17 Interlayer film
18 Resin layer
20 Pixel electrode
22, 221, 222, 223, 224 Photo spacer (PS)
22a, 450 Main photo spacer
22b Sub photo spacer
32 Color resin layer
33 Common electrode
100, 200, 300, 400 Liquid crystal display panel
110, 410 TFT array substrate
120 Liquid crystal layer
121 Liquid crystal molecule
130, 430 Counter substrate
210 Hole
d Gap
h1 Height of main spacer
h2 Height of sub spacer

The invention claimed is:

1. A liquid crystal display panel comprising:
a thin film transistor substrate including a pixel electrode;
a counter substrate including a counter electrode;
a liquid crystal layer disposed between the thin film transistor substrate and the counter substrate; and
spacers provided at at least four corners of a pixel defined by the pixel electrode; wherein
the counter electrode includes a hole located at a center of the pixel;
the spacers are provided on the thin film transistor substrate and taper towards the counter substrate;
the liquid crystal display panel aligns liquid crystal molecules perpendicularly to the substrate surfaces when no voltage is applied;
the liquid crystal molecules are aligned in a direction parallel or substantially parallel to a substrate surface of the thin film transistor substrate and aligned along a line extending from the four corners of the pixel towards a center of the pixel when a voltage which is not lower than a threshold voltage is applied;
the thin film transistor substrate includes a scanning line;
the scanning line is arranged to pass through the center of the pixel; and
the hole of the counter electrode is provided in a region where the scanning line is provided.

2. The liquid crystal display panel according to claim 1, wherein the spacers are located at an intersection of a signal line and a storage capacitor line or an intersection of a signal line and a scanning line.

3. The liquid crystal display panel according to claim 1, wherein the liquid crystal display panel divides alignment in a pixel by the spacers.

4. The liquid crystal display panel according to claim 1, wherein the spacers include a first spacer configured to control the thickness of a liquid crystal layer, and a second spacer different in height from the first spacer.

5. A liquid crystal display device comprising the liquid crystal display panel according to claim 1.

6. The liquid crystal display panel according to claim 1, wherein the thin film transistor substrate includes a storage capacitor line, and
the hole of the counter electrode is provided in a region opposed to where the storage capacitor line is provided.

7. The liquid crystal display panel according to claim 1, wherein the spacers are provided on the pixel electrode.

8. The liquid crystal display panel according to claim 1, wherein the pixel electrode is provided with a notch.

* * * * *